United States Patent
Blackmon, Jr. et al.

(10) Patent No.: US 6,708,687 B2
(45) Date of Patent: Mar. 23, 2004

(54) THERMALLY CONTROLLED SOLAR REFLECTOR FACET WITH HEAT RECOVERY

(76) Inventors: James B. Blackmon, Jr., 4845 Cove Creek Dr., Brownsboro, AL (US) 35741; Nelson Edwin Jones, 2729 Austin Ct., Los Osos, CA (US) 93402-4304; Robert E. Drubka, 6801 Gaslight Dr., Huntington Beach, CA (US) 92647

( * ) Notice: Subject to any disclaimer, the term of this patent is extended or adjusted under 35 U.S.C. 154(b) by 0 days.

(21) Appl. No.: 09/879,363

(22) Filed: Jun. 12, 2001

(65) Prior Publication Data

US 2002/0185124 A1 Dec. 12, 2002

(51) Int. Cl.7 .................. F24J 2/02; F24J 2/38
(52) U.S. Cl. ............. 126/680; 126/599; 126/684; 126/690; 126/696; 126/686; 126/712; 126/685; 126/640; 359/845; 359/858; 359/883
(58) Field of Search ............. 126/380, 686, 126/684, 712, 690, 696, 657, 691, 640, 578, 615, 685, 589, 599; 359/853, 870, 883, 848, 845

(56) References Cited

U.S. PATENT DOCUMENTS

| | | | |
|---|---|---|---|
| 3,217,702 A | * 11/1965 | Miller | 126/680 |
| 4,007,729 A | 2/1977 | Chao et al. | |
| 4,394,814 A | 7/1983 | Wardman et al. | |
| 4,435,043 A | * 3/1984 | Mertens et al. | 126/684 |
| 4,452,232 A | * 6/1984 | David | 126/587 |
| 4,479,488 A | 10/1984 | Steinberg | |
| 4,617,911 A | 10/1986 | Adler | |
| 4,947,825 A | 8/1990 | Moriarty | |
| 5,150,253 A | 9/1992 | Watanuki | |
| 5,275,150 A | * 1/1994 | Lai | 126/569 |
| 5,404,869 A | * 4/1995 | Parkyn et al. | 126/698 |
| 5,518,554 A | 5/1996 | Newman | |
| 5,578,140 A | * 11/1996 | Yogev et al. | 136/246 |
| 5,751,503 A | 5/1998 | Blackmon et al. | |
| 5,850,831 A | * 12/1998 | Marko | 126/645 |
| 5,862,800 A | * 1/1999 | Marko | 126/651 |
| 5,915,376 A | * 6/1999 | McLean | 126/653 |
| 5,947,114 A | * 9/1999 | Kribus et al. | 126/680 |
| 5,956,191 A | 9/1999 | Blackmon et al. | |
| 5,979,438 A | * 11/1999 | Nakamura | 126/578 |
| 6,003,508 A | * 12/1999 | Hoffschmidt et al. | 126/674 |
| 6,045,231 A | * 4/2000 | Martineau | 359/838 |
| 6,080,927 A | * 6/2000 | Johnson | 126/562 |
| 6,131,565 A | * 10/2000 | Mills | 126/577 |

FOREIGN PATENT DOCUMENTS

WO   WO 02/00428 A2 *   1/2002   .......... B32B/17/10

* cited by examiner

Primary Examiner—Henry Bennett
Assistant Examiner—Kathryn Odland (57) ABSTRACT

A method and high concentration central receiver system provide improved reflectors and a unique heat removal system. The central receiver has a plurality of interconnected reflectors coupled to a tower structure at a predetermined height above ground for reflecting solar radiation. A plurality of concentrators are disposed between the reflectors and the ground such that the concentrators receive reflective solar radiation from the reflectors. The central receiver system further includes a heat removal system for removing heat from the reflectors and an area immediately adjacent the concentrators. Each reflector includes a mirror, a facet, and an adhesive compound. The adhesive compound is disposed between the mirror and the facet such that the mirror is fixed to the facet under compressive stresses.

16 Claims, 7 Drawing Sheets

THERMALLY CONTROLLED SOLAR REFLECTOR FACET WITH HEAT RECOVERY

BACKGROUND OF THE INVENTION

1. Technical Field

The present invention relates to solar power plants. More particularly, the invention relates to a high concentration central receiver system having improved reflectors and a unique heat removal system.

2. Discussion

As concerns over the environment, the deterioration of fuel sources, and energy efficiency continue to increase, solar power plants have become the subject of worldwide attention. In the development of solar power plants, high concentration central receiver systems have demonstrated a relatively high level of usefulness and are therefore quite popular. The conventional solar central receiver system has a "tower top" configuration in which a field of heliostats reflect sunlight onto a receiver mounted on a tower structure. The concentrated solar energy on the receiver heats a fluid, such as oil or molten salt, to high temperatures. This energy is then transferred to a boiler/heat exchanger to produce steam, which then powers a steam turbine to produce electricity. While this type of configuration has been shown to be useful for power plants, other configurations have proven to be more effective for large power plants, especially when operated with high efficiency, combined cycle gas turbines powered by both natural gas and solar energy.

One such configuration is the "tower reflector" configuration. One of the major features of this type of configuration is that special parabolic concentrators are located on the ground beneath the tower and reflectors are coupled to the tower structure at a predetermined height above ground for reflecting solar radiation. The tower-mounted reflectors redirect sunlight from the heliostats, to the parabolic concentrators which are located on the ground. The tower-mounted reflector is composed of a number of mirrors, coupled to a metallic facet (or heat exchanger) for support. Each parabolic concentrator typically has a special quartz receiver into which the concentrated light is directed. Air flowing through this receiver is air heated to a high temperature and then passes into the turbine combustion chamber, where it is further heated, before passing through the turbine to produce electric power by turning the generator.

It is critical that the tower mounted reflectors provide the light into the aperture opening of the parabolic concentrators at the appropriate angles under a wide variety of conditions. These conditions include temperature changes, wind variations, solar insolation levels, sun angles, etc. It is very desirable that the concentrators have very little loss due to "spillage" under these conditions, because conventional systems make no use of this wasted heat. The tower reflectors must therefore achieve high optical quality at a low cost. The tower reflectors must also be able to withstand high concentrations of solar energy and meet the optical requirements under a wide variety of environmental conditions. It is therefore desirable to provide reflectors having a good structural integrity and that are safe to operate. It is also desirable to enable the reflectors to be adjustable and configurable such that there is minimal loss of reflected light from the heliostats in harsh environments and over several decades.

A particularly difficult aspect of conventional solar reflectors relates to high operating temperatures, cost and breakage. Specifically, while various facet designs and heat removal systems have been designed for tower reflectors, a number of difficulties remain. For example, the conventional design has a small reflector area and uses small, high tensile strength, thick glass mirrors. Generally, these mirrors have been shown to be too costly for practical use in high temperature commercial applications. The conventional design is also prone to breakage, since the glass is held by "clips" such that there are slight stresses built up in the glass under nominal conditions. It is therefore easy to understand that such systems can impose relatively high levels of stress at local points under more severe conditions. For example, high stresses occur (especially when exposed to sand, dust and ice, since these can cause "ratcheting") when the glass expands and contracts due to exposure to diurnal cycles of high concentration irradiance, with high temperatures, followed by little or no irradiance and relatively cool temperatures.

The resultant expansion and contraction, with metal joints used to hold the glass securely for good alignment, can result in high local stresses and breakage. Since the glass is not otherwise constrained, it can fall, causing a significant hazard to equipment and personnel below. In particular, the falling glass can damage the high optical quality, relatively high cost Compound Parabolic Concentrators (CPCs) on the ground. These thermal and stress related problems are exacerbated further by the exposed clips, which can be subjected to over 50 to 100 suns (i.e., 50 to 100 kW/m$^2$). Since the metal has a relatively high solar absorptivity, the operating temperature of the metal clips can be quite high, thus adding to the local thermal stresses already placed on the facets by the direct, concentrated solar flux.

The conventional approach also does not provide for adequate thermal control to prevent ice buildup. Ice buildup on high structures is a serious problem, since it can greatly increase the structural load, distort and damage the glass mirrors. If ice forms and falls onto the CPCs, further damage is likely to be caused to the system. It is therefore desirable to provide a design that ensures thermal control to prevent buildup.

Another aspect of the conventional design is that it uses a rectilinear support structure. Such supports do not offer the torsional stiffness inherent in geometries such as triangular shapes. The mass of material required, and the complexity of assembly (as well as cost) are therefore higher than for other geometric shapes. For example, the triangular design disclosed herein, is formed with a novel "geodesic dome" concept, that uses essentially equilateral struts arranged with novel attachment fittings to allow easy assembly of the support structure and adjustment of the facets.

In the more general case, for certain applications, mirrors are heated by incident solar irradiance and/or heat flux. This heating can cause damage to the mirrors or to the support backing structure. Furthermore, the optical quality can be degraded by changes in the radius of curvature, increases in the surface slope error, damage to the reflective surface, or warpage. The problem is typically solved by either selecting high tensile strength glass (at high cost), flowing a stream of air over the mirror, or using a fluid coolant. It is important to note that while conventional coolant-based heat removal systems are moderately effective in sinking heat away from the reflectors, other shortcomings remain. For example, the "spillage" area immediately adjacent the concentrators is also a considerable source of heat. Removing heat from this area would both improve the operation of the concentrators as well as provide additional heat to other systems (e.g., residential/commercial systems). As already mentioned, extreme cold or ice buildup can also cause problems. These problems include warpage of the facet or its support structure, changes in the facet cant angle, build-up of extremely high loads on the structure, or cracks in the glass. To mitigate concerns of extreme cold and ice buildup, an embodiment of the invention utilizing a fluid coolant heat recovery system can maintain adequate coolant temperatures to prevent formation of ice and protect the area from extreme cold.

In general, the mirrors must be adjusted to produce the beam positioning required by the application. This problem is typically solved by attaching multiple (most often, three) adjustable attachment fittings to the back of the mirror assembly. Also, for certain applications, the mirror assembly must be very light weight, and in some applications the mirror must be mounted in a location where access is difficult. For example, in the tower reflector case, the reflectors are mounted high above the ground (hundreds of feet high). Therefore, the reflectors must demonstrate exceptional long life and integrity, while at the same time being light weight and inexpensive.

SUMMARY OF THE INVENTION

The above and other objectives are provided by a method and high concentration central receiver system in accordance with the present invention. The central receiver system has a plurality of interconnected reflectors coupled to a tower structure at a predetermined height above ground for reflecting solar radiation. A plurality of parabolic concentrators are disposed between the reflectors and the ground such that the concentrators receive reflected solar radiation from the reflectors. The central receiver system further includes a heat removal system for removing heat from the tower-mounted reflectors and an area immediately adjacent the parabolic concentrators. Removing the heat from the area immediately adjacent the concentrators improves operation of the concentrators and provides an additional source of energy that is effectively wasted in conventional systems.

Further in accordance with the present invention, a reflector for a high concentration central receiver system is provided. The reflector includes a mirror, a facet, and an adhesive compound. The facet has walls defining a coolant channel, where the cooling channel receives a heat conductive fluid. The adhesive compound is disposed between the mirror and the facet such that the mirror is fixed to the facet under compressive stresses. In the preferred embodiment, the glass mirror has a compression stress value such that no part of the glass experiences tensile stresses. Generating compressive stresses in the mirror improves the strength and resistance to breakage because glass has a low tensile strength. Pre-loading the glass in compression thus avoids the most common failure mode for glass.

In another aspect of the invention, a method for fabricating a reflector for a high concentration central receiver system is provided. The method includes the step of maintaining a mirror at a mirror bonding temperature. A metal facet is maintained at a facet bonding temperature, where the facet bonding temperature is greater than the mirror bonding temperature. The method further includes the step of bonding the mirror to the facet with an adhesive, where an operating temperature for the reflector is less than the facet bonding temperature. Due to the inherent properties of glass and metal, the mirror is under compressive stresses at the operating temperature.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one of ordinary skill in the art by reading the following specification and sub-joined claims and by referencing the following drawings, in which:

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

Figure 1:
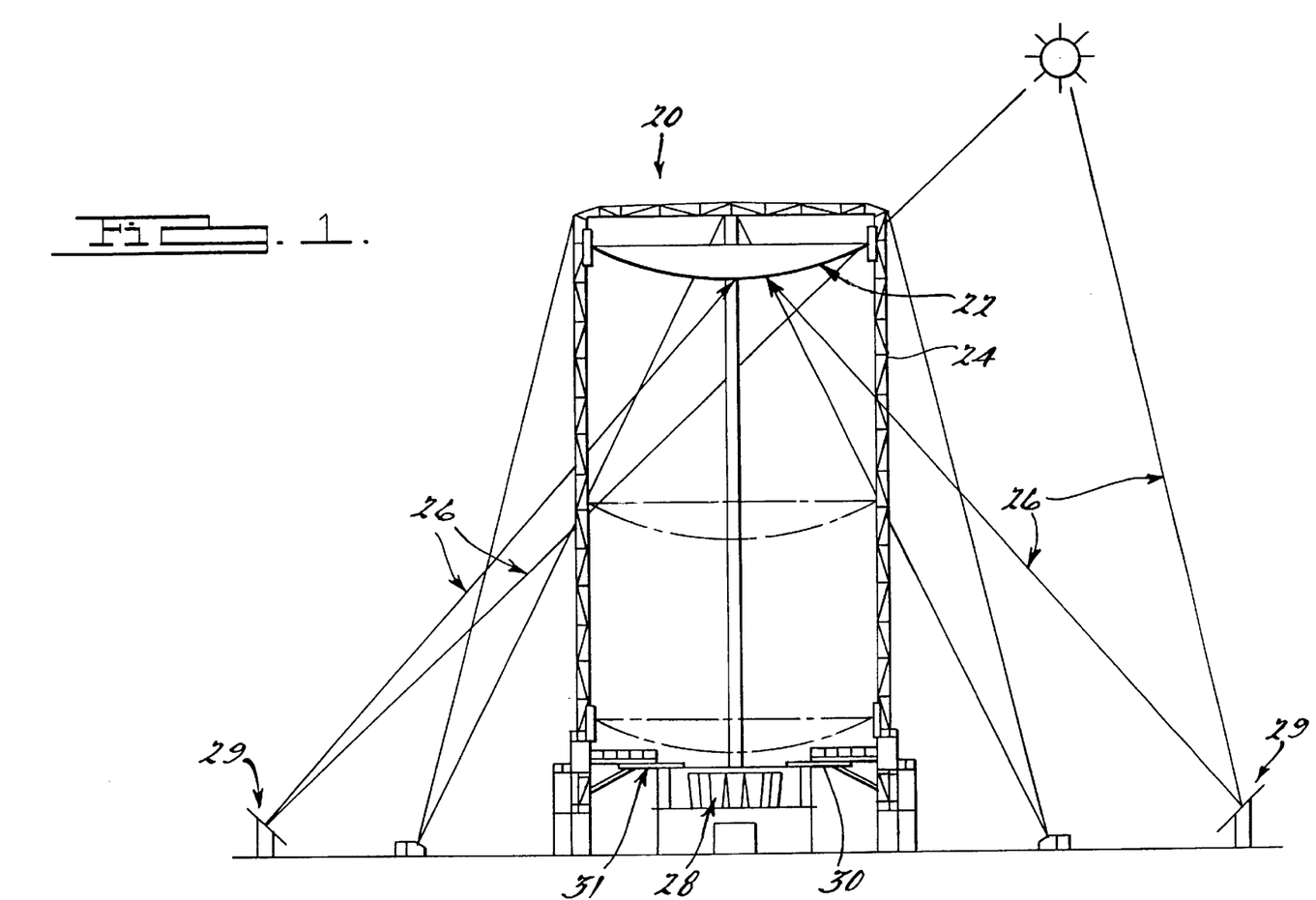
FIG. 1 is a diagram of a tower structure with a high concentration central receiver system according to the present invention.

Turning now to FIG. 1, a high concentration central receiver system 20 is shown in greater detail. The receiver system 20 has a plurality of interconnected reflectors 22 (or reflector assemblies) coupled to a tower structure 24 at a predetermined height above ground for reflecting solar radiation 26. A plurality of concentrators 28 are disposed between the reflectors 22 and the ground such that the concentrators 28 receive reflected solar radiation from the reflectors 22. A heat removal system 30 (or spillage collector) removes heat from the reflectors 22 and an area immediately adjacent the concentrators 28.

Thus, FIG. 1 shows the basic beam down optics central receiver concept with the reflectors 22 located atop a high tower structure 24 (of the order of several hundred feet). The solar irradiance is concentrated on the reflectors 22 from a field of heliostats 29. For a 10 Megawatt (thermal) system, approximately 1300 heliostats, each approximately 9 to 10 square meters in area, are needed. The solar flux, or irradiance, incident on the tower can easily range up to approximately 50 kW/m$^2$, or higher, which could cause high temperatures (several hundred degrees F. in the glass and higher in any exposed support structure). For this reason, the mirrors of the reflectors 22 are cooled to prevent changes in optical properties, warpage, breakage, or separation of the glass and supporting structure. The heat removal system 30 also prevents other forms of damage and degradation, such as overheating of the support structure, loss of silver, accelerated corrosion at high temperature, deposition of foreign materials (with subsequent hot spots caused by the incident highly concentrated solar flux), etc. The mirrors are also overlapped, to minimize concentrated sunlight from overheating the support structure behind the mirrors.

Figure 2:
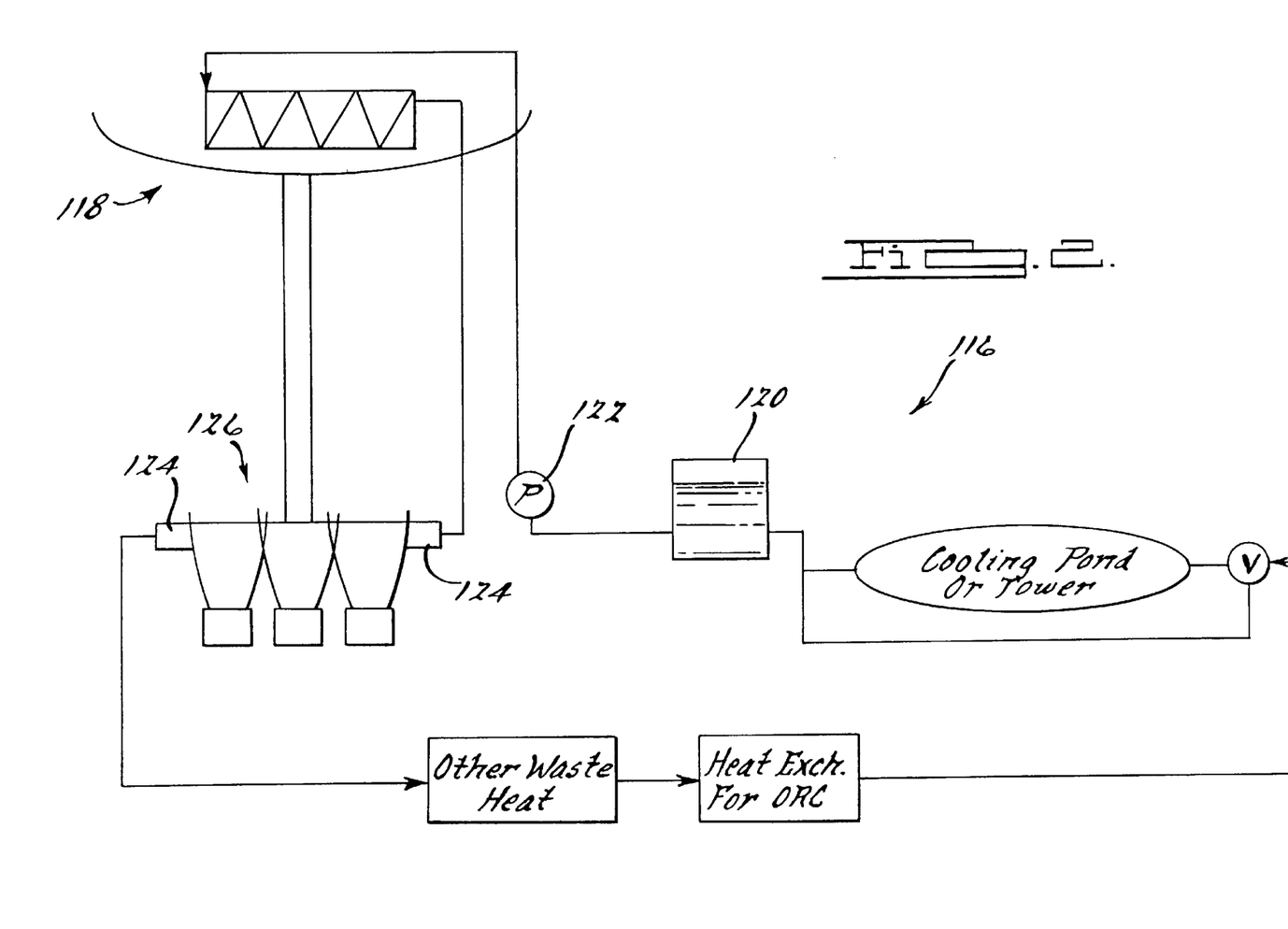
FIG. 2 is a diagram of a heat removal system in accordance with the principles of the present invention.

FIG. 2 shows the heat removal system 116 block diagram. A heat transfer fluid, such as water, mixed with an antifreeze (e.g., propylene glycol), is contained in a tank, 120. A pump 122 pumps the liquid through a pipe to the tower reflector structure where it passes through each of the mirror assemblies 118. The temperature is raised from initial inlet temperatures in the tank of the order of 10 to 30° C. to outlet temperatures of the order of 50 to 90° C. The heat transfer fluid then flows through a pipe down to the "spillage collector" 124 that surrounds the compound parabolic concentrators 126. The fluid temperature is further increased, to temperatures of the order of 100–120° C. The heat transfer fluid then passes through an optional heat exchanger capable of transferring additional waste heat and further raising the temperature. The heat transfer fluid then passes through a heat exchanger suitable for the selected end-use of the collected waste heat. For example, the waste heat can be used to heat and/or desalinate water for residential or industrial use. It can also be used in an organic Rankine cycle (ORC) turbine generator, similar to geothermal heat recovery, to produce electricity. The heat transfer fluid exits the heat exchanger at a temperature on the order of 40 to 60° C. and can be further cooled by passing through coils submerged in a cooling pond or in a cooling tower prior to entering the holding tank 120.

Although a series flow path is shown, other flow configurations can be used. For example, the flow out of the pump can be split such that part flows directly to the spillage collector 124 and part flows to the tower reflector 118.

It should be noted that there are substantial pressure differences due to the hydrostatic head. The pressure through the mirror assemblies is relatively low, compared to the pressure at ground level. This provides two advantages. First, the lower pressure in the mirror assemblies minimizes distortion of the mirrors. However, the distortion that occurs essentially causes the mirror to form a slightly convex mirror surface, as seen from below. This convex mirror surface is closer to the ideal hyperbolic shape, and this improves the mirror optical quality.

Second, the higher pressure at ground level allows the heat transfer fluid to remain a liquid or a two-phase mixture at moderately high temperatures, thus improving heat transfer. As long as the two-phase flow remains in the bubbly and slug flow regimes, the annular flow regime, or the initial region of annular to mist transition, the heat transfer coefficient will be high. However, as the fluid becomes a mist flow or forced convection vapor flow, the heat transfer coefficient drops substantially. The lower heat transfer coefficient increases the required temperature difference in heat exchanger size and cost and is thus to be avoided. The higher pressure helps keep the heat transfer fluid in the high heat transfer coefficient region.

Figure 3A:
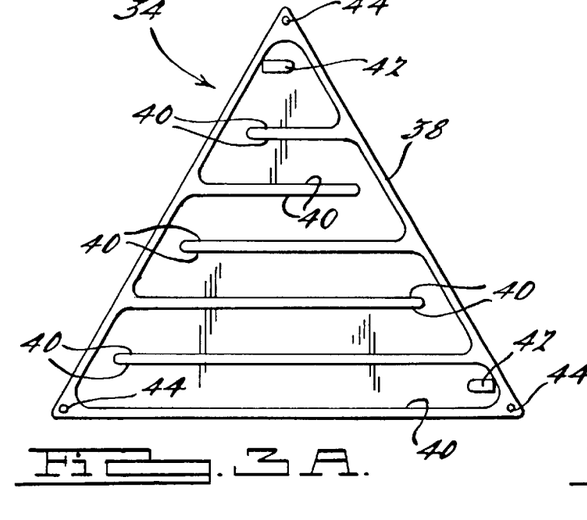
FIG. 3A is a top view of a reflector according to one embodiment of the present invention.
Figure 3B:
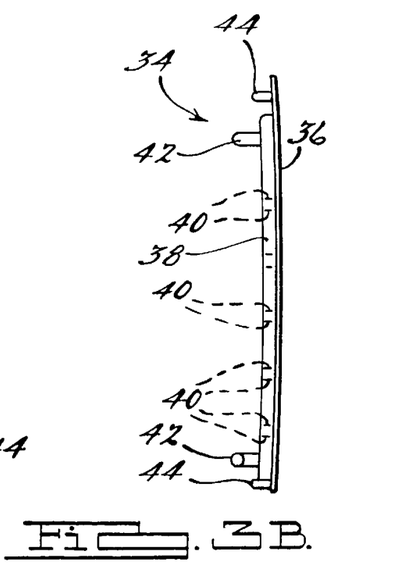
FIG. 3B is a side view of the reflector shown in FIG. 3A.

Turning now to FIGS. 3A and 3B, it can be seen that in one embodiment each reflector 34 includes a mirror 36 and a facet 38 having walls 40 defining a coolant channel. The coolant channel is connected to one or more adjacent reflectors such that the adjacent reflectors receive a heat conductive fluid from the heat removal system and pass the fluid through the channel. An adhesive compound is disposed between the mirror 36 and the facet 38 such that the mirror 36 is fixed to the facet 38 under compressive stresses. Thus, FIGS. 3A and 3B show two views of a reflector 34 having a single pass coolant fluid path. Although the preferred design has a triangular geometry, the present invention is not constrained to this shape. Other shapes (e.g., rectangular, hexagonal, circular, or square) may therefore be used without parting from the spirit and scope of the invention.

As already noted, the mirror 36 is bonded to the facet 38 (or backing plate). Note that the mirror 36 may be glass or glass laminated to a protective substrate (sheet steel or plastic) and may be one piece or several pieces. Mirrors with the silver reflector coating on the back side of the glass and with a protective substrate are commonly referred to in the industry as second surface mirrors. This assembly is held in a fixture during the adhesive curing cycle to obtain the required finished contour (e.g., flat, cylindrical, spherical, parabolic, or hyperbolic). The portion of the drawing in FIG. 3B shows the flow path that is formed by the facet design. The facet 38 is embossed, stamped, or hydroformed metal or reinforced plastic (match die molded, or spray/hand lay-up) to yield the cavities for the cooling media to pass through. Note that reference is made to "cooling" where, as will be explained below, certain applications require a heated fluid.

It is also important to note that FIGS. 3A and 3B show simple "L" shaped fluid fittings 42, which may be welded, brazed, or bonded, etc. to the facet 38, depending on the application and materials selected. For support, three attachment fittings 44 are secured to the facet 38. While the illustrated attachment fittings 44 are simply threaded studs that may be welded, brazed or bonded to the facet 38, other options will be detailed later.

It will be appreciated that the flow path may be designed in several different ways to achieve the desired effect. For example, FIGS. 3A and 3B show a simple, single pass approach. The depth and width of the cavity should be optimized to supply the necessary cooling by providing the required fluid velocity and pressure drop for the system (especially when a large number of mirror facets are connected in series). Modifications to this simple configuration will be described below.

Figure 4A:
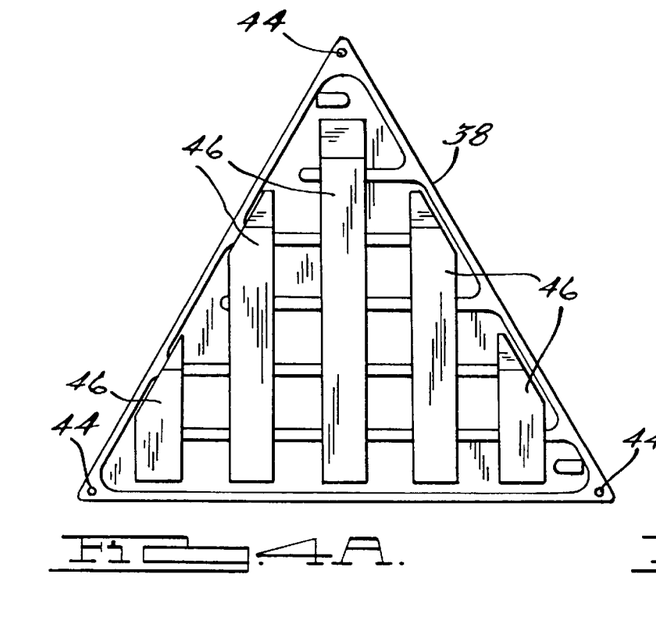
FIG. 4A is a top view of a reflector having cooling fins according to an alternative embodiment of the present invention.
Figure 4B:
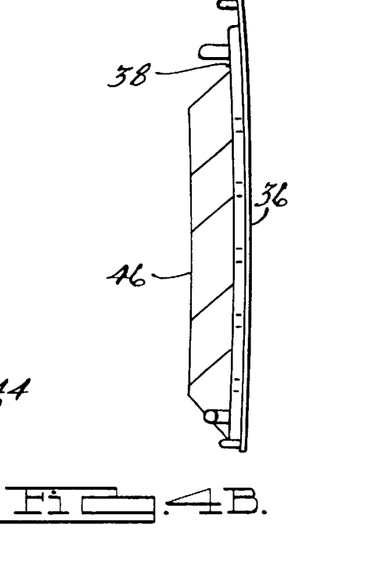
FIG. 4B is a side view of the reflector shown in FIG. 4A.

FIG. 4A and FIG. 4B show the same simple, single pass facet 38 as shown in FIGS. 3A and 3B, with cooling fins 46 attached. This design offers the additional advantage of ensuring a uniform temperature of the mirror 36, due to the coolant flow, while rejecting the heat to the atmosphere. This approach could be used when it is not necessary to recover the waste heat. The cooling fins 46 of this design would preferentially be made from metal in order to have good heat transfer, but plastic materials (especially with good thermal conductivity) are also permissible. For facets 38 that are formed from metal, welding or brazing of the cooling fins 46 would provide efficient heat transfer. For applications that are weight dependent, the fins undesirably add weight to the assembly, but they offer very good stiffness advantages. Therefore the facet 38 may be made thinner while maintaining equivalent facet stiffness.

Figure 5A:
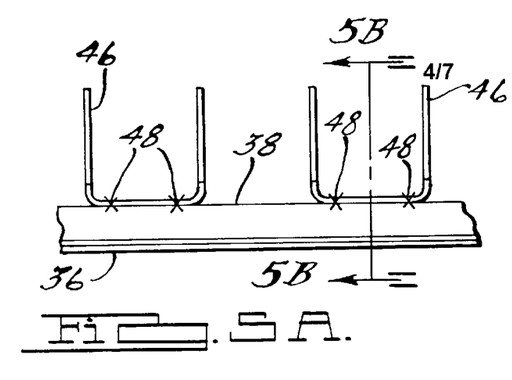
FIG. 5A is an end view of a reflector having cooling fins according to an alternative embodiment of the present invention.
Figure 5B:
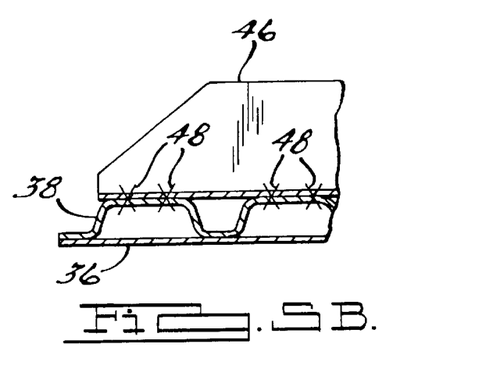
FIG. 5B is a cross sectional view taken along lines 5B—5B shown in FIG. 5A.

FIG. 5A and FIG. 5B illustrate detailed views of the preferred cooling fin design. For facets made of steel, stainless steel, aluminum, copper, etc., spot welding or roll-spot welding of the cooling fins 46 are simple and efficient methods for providing good heat transfer across the junctions 48. Welding also provides adequate strength to maintain the stiffening qualities of the assembly. Bonding with a thermally connecting adhesive is also a viable option.

To provide the coolant, the mirrors are connected to a fluid cooling loop via fittings on the back surface. Each mirror facet has a coolant path provided by an embossed or ribbed structure which provides the flow channels required. The configuration of the flow can be single or double pass, but other options are possible. This supporting structure for the coolant flow may be formed sheet metal (steel, stainless steel, aluminum, etc.) or a plastic material (sheet molding compound, spray or hand layup fiberglass, graphite/epoxy, etc.).

It should be noted, however, that the best combination of glass and facet from the standpoint of reducing the tensile stress in the glass is the selection of materials that have similar coefficients of thermal expansion (CTE) to minimize tensile stress, or, for the situation in which compressive loads are imposed on the glass, the facet should preferentially have a CTE slightly greater than that of the glass. Typically, fiber glass or steel comes closest to matching the coefficient of thermal expansion of the various types of glass that are candidates for this design, and both of these have CTEs slightly higher than glass. Aluminum has CTE significantly higher than glass, but care must be taken to ensure that the stresses induced do not cause excessive deformation. Other reflective surfaces are potential candidates, but due to the lack of long life and low cost materials, the high reflectivity of silvered glass is preferred. Thus, although the preferred embodiment uses either steel, aluminum, or fiberglass for the facet, the present invention is not restricted to these materials.

Another aspect of the design that reduces the stress on the glass is the use of an adhesive that has the correct combination of compliance and thermal conductivity. In fact, various adhesives satisfy these criteria, as specified further below. The glass can also be bonded to a thin, protective sheet metal or composite material having a good thermal conductivity characteristic, using a double backed sheet adhesive. Alternatively, the adhesive can be applied directly to the glass back surface and/or to the facet by various well known techniques (spray, curtain coat, roller coat, brush, etc.). The glass mirror without the protective laminate layer is then bonded (with a thermally conductive adhesive) to the triangular facet that provides the coolant loop for thermal control.

Regardless of the material selected for the facet, the internal coolant loop flow path is designed to be large enough in cross sectional area, short enough in path length, and the flow rate selected to be low enough such that flow resistance is not excessive. At the same, time the facet provides sufficient conditions for effective heat transfer to control the temperature of the glass, and the resultant stresses, to acceptable levels. In particular, the glass temperature is uniform across its surface, to minimize stress concentrations, and is maintained at temperatures of approximately 50 to 100 degrees Centigrade, or lower. Various means may be employed to enhance the heat transfer.

Figures 6A, 6B, 6C, 6D:
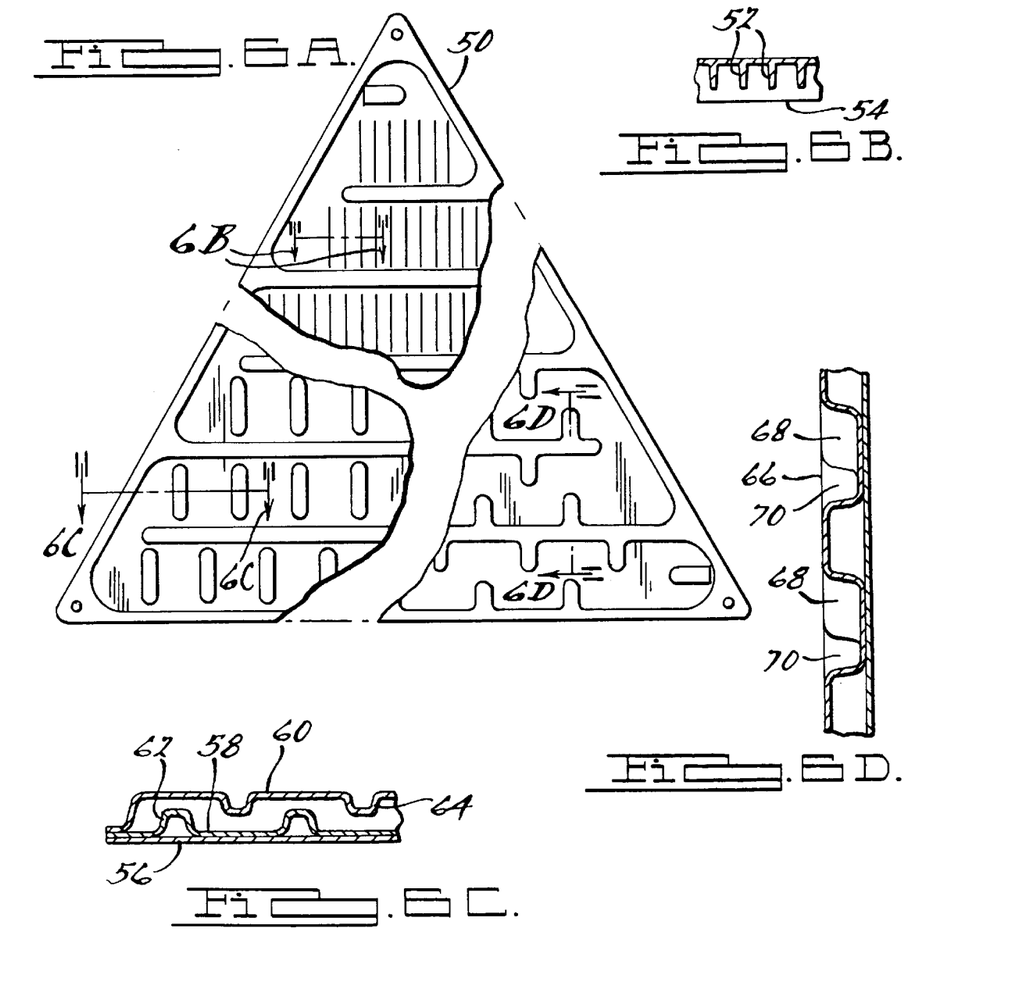
FIG. 6A is a cutaway top view of a reflector showing three embodiments of a turbulence generating system according to the present invention.
FIG. 6B is a cross sectional view taken along lines 6B—6B shown in FIG. 6A.
FIG. 6C is a cross sectional view taken along lines 6C—6C shown in FIG. 6A.
FIG. 6D is a cross sectional view taken along lines 6D—6D shown in FIG. 6A.

FIGS. 6A–6D illustrate three different methods of adding turbulent generating features to the design to further enhance heat transfer. Heat transfer is greatly improved when the coolant is in a state of turbulent flow. For this reason, some means of disturbing the laminar flow conditions may be required for a specific application, especially in the vicinity of the thermally conducting fins. The upper example of FIG. 6B shows how a molded facet 50 could have inner fins 52 formed on the interior to force the fluid into a turbulent state. Note this increases the pressure drop (and therefore the need for a stronger panel design). The fins 52 may be contoured such that the base of each fin 52 stiffens the facet 50, but the tip is flexible enough to "flutter" and cause additional turbulence, especially in the vicinity of the inner surface of the heated mirror 54.

Where the mirror 56 is bonded to a metal substrate 58, as shown in the lower left example of the FIG. 6C (thence bonded to the facet 60, the substrate 58 may be formed with inner projections 62 to alternate with similar deformations 64 in the facet 60. The lower right hand portion of FIG. 6D shows how the facet 66 may be formed to have a serpentine path for the fluid as it passes around projections 68 from the formed dividers 70 of the facet 66.

Figure 7:
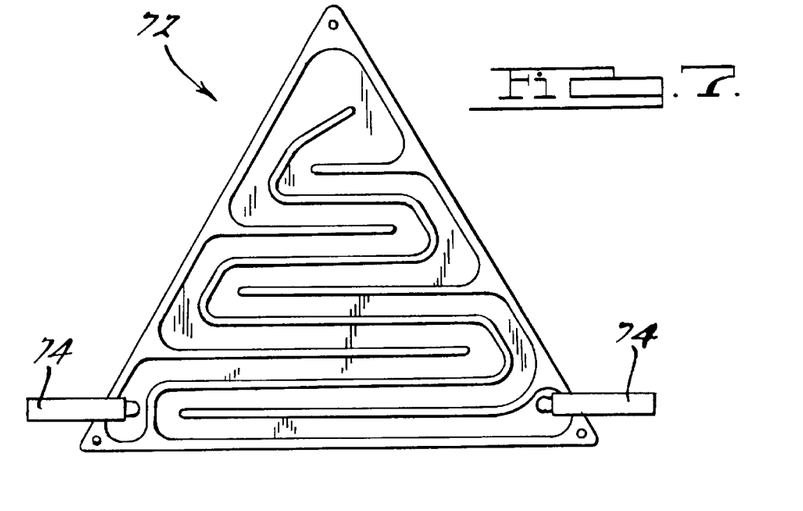
FIG. 7 is a top view of a reflector having facet walls that define a plurality of channels according to an alternative embodiment of the present invention.

FIG. 7 shows a reflector 72 having a two-path flow for the fluid. This approach has two particularly important advantages. First, this flow configuration tends to better average the facet temperature. Secondly, it allows the inlet and exit fluid fittings 74 to be inline. Although this is of little advantage for one facet, the facet interconnect becomes much simpler for a group of facets as seen in FIG. 8 to follow.

Figure 8A:
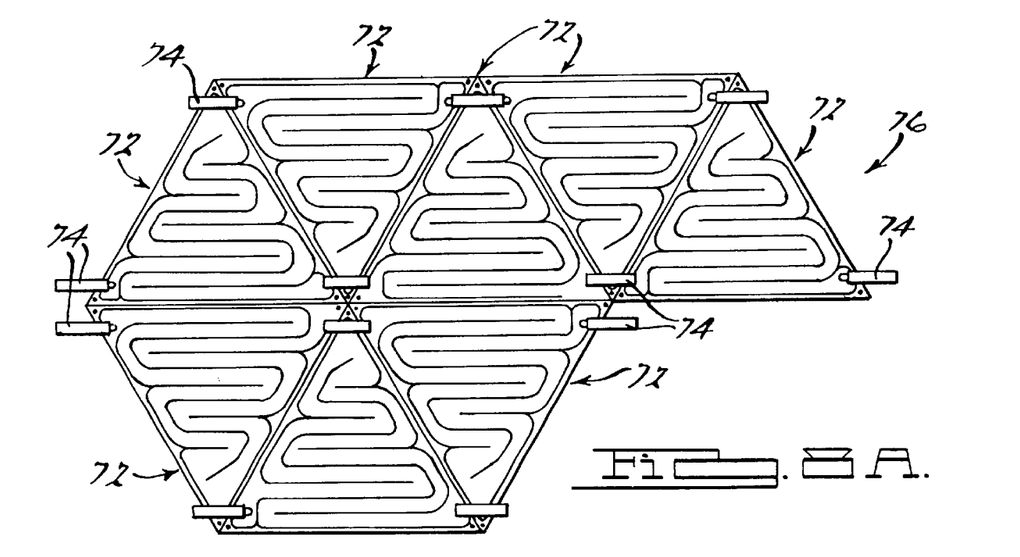
FIG. 8A is a top view of a plurality of interconnected reflectors wherein each reflector has facet walls that define a plurality of coolant channels according to an alternative embodiment of the present invention.
Figure 8B:
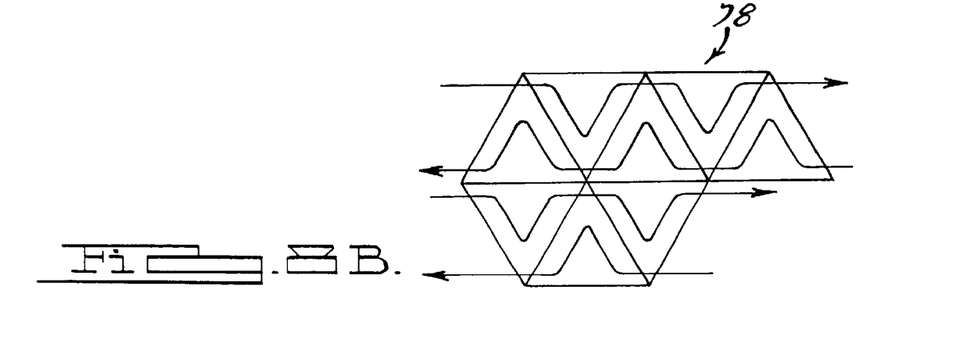
FIG. 8B is a diagram showing coolant flow paths for the configuration shown in FIG. 8A.

FIG. 8A and FIG. 8B illustrate how multiple reflectors 72 of the two-path flow type may be connected to achieve efficient cooling of a portion of a large facet array 76. With this configuration, a simple plastic or rubber tube may be used as a fluid fitting 74 for low to moderate pressure systems. This resilience allows for adjustment of the individual facets (via various attachment fittings) without straining the structures. The insert sketch of FIG. 8B shows a simplified flow pattern 78 for this type of interconnect.

Figure 9:
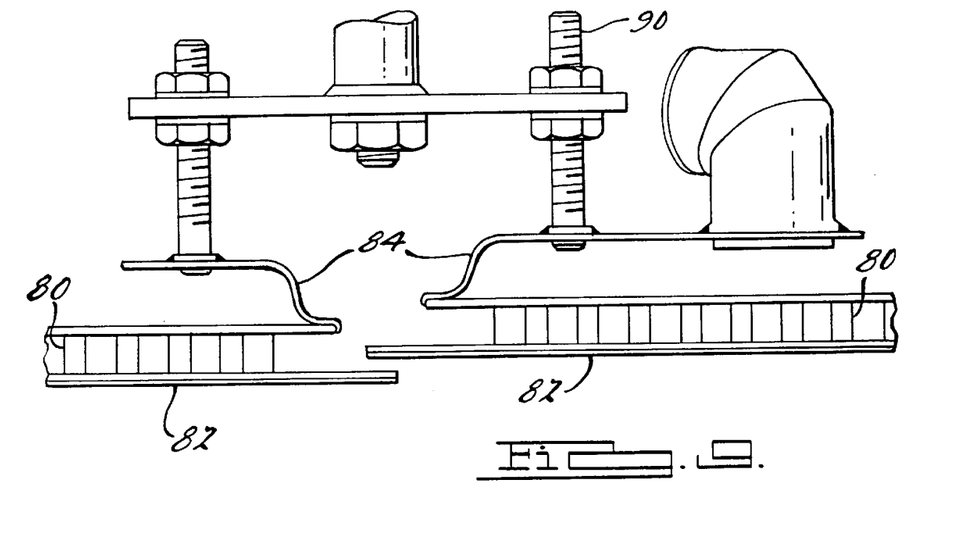
FIG. 9 is a side view of a plurality of reflectors, where the reflectors have honeycomb shaped stiffening plates.

FIG. 9 shows a facet design with a honeycomb-shaped stiffening plate 80 supporting the mirror 82. The plate 80 increases the stiffness such that higher pressure drops across the facets 84 can be accommodated without causing the mirror to deform in a short radius of curvature convex shape (looking at the mirror) that could tend to spread the reflected beam by an excessive amount.

Figure 10:
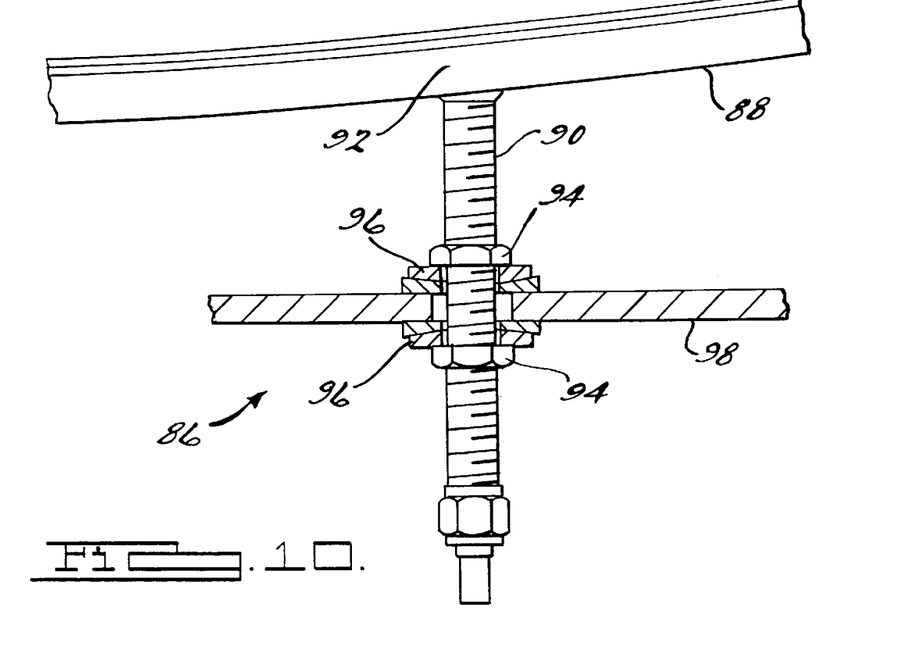
FIG. 10 is a side view showing attachment fittings according to one embodiment of the present invention.

FIG. 10 shows a variation on the simple attachment design shown in FIGS. 3 and 9 for which the attachment fittings 44 are simple, threaded studs. Here the adjusting mechanism 86 is also used for the fluid inlet/exit paths. The facet 88 has the coolant feed fitting 90 welded, brazed, or bonded to one of the raised flow paths 92. These flow paths 92 should be positioned so that they are parallel to each other to minimize alignment problems at the time of the installation. A pair of lock nuts 94 and two sets of spherical washers 96 are used to attach the facet 88 to the support structure 98. Preferably, the structure 98 has an oversized hole to allow for alignment variations. The coolant feed fitting 90 shown is a straight threaded tube, but other designs may be used for specific applications. For example, a ball stud can be used to accommodate large angular variations. Since a triangular facet will typically require three points of support (to minimize distortion of the mirror), one of the coolant feed fittings 90 could be a "dummy" and not be drilled through, or formed from a tube, for a flow passage as the other two are. However, there are other flow configurations that can benefit from having one or two inlets with a corresponding two or one outlets. This is especially true at the outer periphery of the set of facets, where the flow enters an outer annular ring.

Figure 11:
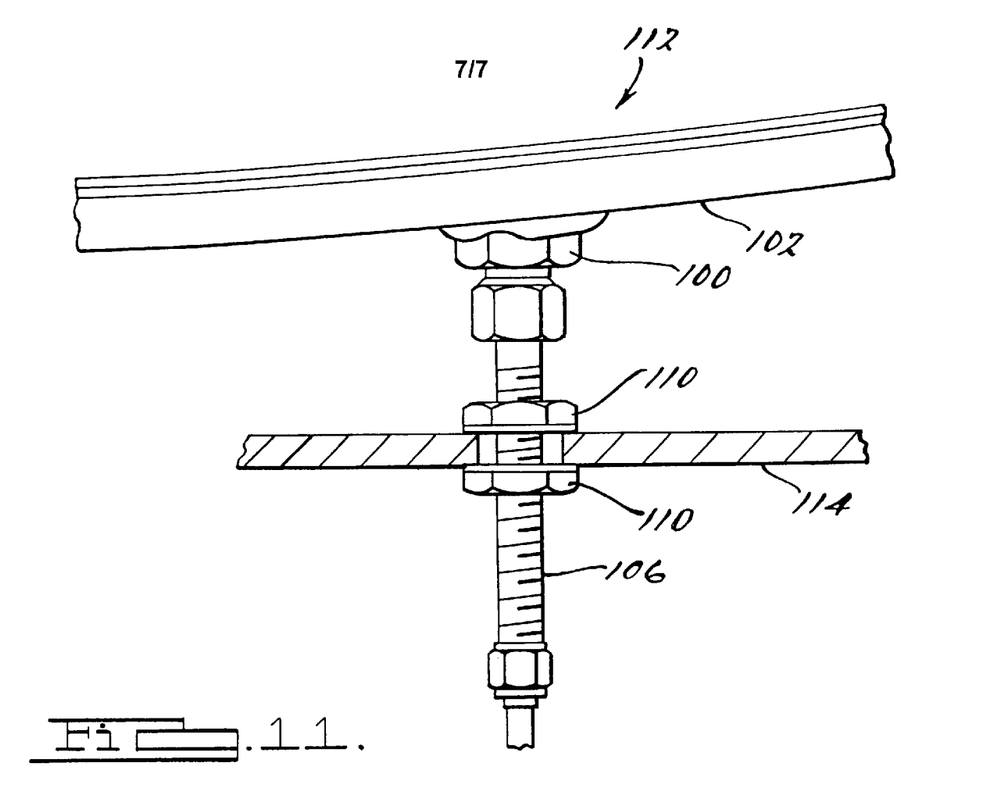
FIG. 11 is a side view showing attachment fittings according to an alternative embodiment of the present invention.

FIG. 11 illustrates a variation to the above embodiments. Here a fitting 100 is welded, brazed, or bonded to the facet 102. The design is similar to an AN fluid fitting except that the normal 37 degree flared end has been modified to have a spherical end. The swivel feed line 106 is machined to have a matching spherical (concave) end. A sealing washer effects a leak tight joint while allowing for a minimal amount of variation of alignment. A matching spherical surface is machined on the back side of the flange of the swivel feed line 106. The standard "B Nut" secures the joint when tightened but allows for movement when loosened. Lock nuts 110 secure the reflector 112 to the support structure 114. Note that spherical washers are not required for this design. Also, the tubing sleeve that is normally used with AN fittings, is not needed for this design.

It should further be noted that this design provided three effects that mitigate the glass tensile stress, when properly used. First, the adhesive between the glass and the protective backing (optional) can be sufficiently compliant such that the difference in coefficient of thermal expansion (CTE) does not induce as high a tensile stress as for the case of intimate contact. Second, the adhesive used to bond the glass-protective sheet laminate to the triangular facet (or heat exchanger) adds a further degree of compliance that reduces the stress imposed on the glass. Third, the adhesive (s) and the protective sheet have a temperature drop such that the facet is at a lower temperature than the mirror, for incident solar energy, which tends to reduce stresses, as will be explained further below. Fourth, the adhesive and/or protective sheet thermal conductivity can be selected to provide the preferential temperature gradient properties. We can also minimize the stress in the glass by proper selection of the adhesives and optional protective sheet, for a variety of glass and triangular facet thermal coefficient of expansion characteristics.

Another innovation in our design that further improves the optical performance, structural integrity, life and overall cost effectiveness, lies in the method of forming the completed facet so as to build compressive stresses into the mirror, especially for mirrors having glass that is exposed to high concentrations of solar energy or high loads (i.e., wind). Since the facets may be exposed to high solar irradiance, internal pressure, and temperature, all of which can induce tensile stress in the glass, facet bonding is performed at an elevated temperature of the steel, while controlling the temperature of the glass to be less than that of the steel. The CTE of steel typically exceeds that of the type of glass applicable to mirrors of interest. Therefore, we heat the steel, while cooling the vacuum table/mandrel which is in contact with the glass. The shape of the vacuum table/mandrel can be flat, concave or convex, depending on the required shape of the mirror. Heat applied to the steel accelerates the rate of curing of the adhesive in contact with the steel, which decreases the fabrication time and thus reduces cost. The high temperature bonding and subsequent cooling to the operational temperature range (typically, −20 degrees F. to 120 degrees F.) ensures that there is little or no tensile stress induced in the glass. The same process can be used with aluminum and other metals, as desired.

Minimizing the temperature difference between the glass and the triangular support structure also helps to avoid stress buildup. This is accomplished by using an adhesive, with the proper thickness, that has a high conductivity, usually obtained by loading it with aluminum or other materials. The proper selection of adhesive, glass, and support structure material can be accomplished such that the glass tensile stress (and the delaminating stress on the adhesive bond) are well within the requirements. For example, glass typically can be stressed in tension practically indefinitely at levels of the order of 500 psi or less. The normal breaking tensile stress for glass is approximately 2000 to 3000 psi, or higher, depending on the type of glass. It is therefore important to minimize tensile stress, or preferably, eliminate it by placing the glass in compression as disclosed above.

It is also important that the glass conduct the heat to the facet/heat exchanger, such that the waste heat in the thermal fluid can be recovered and used in power generation, process heat, space heating, etc. Therefore, in our design the appropriate combination of materials having the required thicknesses, compliance, thermal conductivity, and strength are used to meet these combinations of appropriate compliance, thickness, and thermal conductivity. Since steel has a thermal coefficient of expansion (CTE) close to, but higher than that of glass, and since the glass is at a temperature slightly higher than the steel, there is a tendency for the glass and steel to expand at approximately the same rate. Specifically, assume that Tf is the temperature at which the glass and steel are bonded together (both glass and steel are at the same temperature during this process), Tog is the operating temperature of the glass, Tos is the operating temperature of the steel, and CTEg and CTEs are the coefficients of thermal expansion of the glass and steel respectively. Then, when the glass and steel are operated at a temperature different from the temperature at which they were bonded together, there will be some stresses set up in the glass and steel. This stress difference is proportional to the difference in the product of CTEs and temperature difference (Tos−Tf) and the product CTEg and temperature difference (Tog−Tf). At sufficiently high tensile stress values, the glass would break. But, since CTEg is less than CTEs, and Tog−Tf is typically greater than Tos−Tf, there is a tendency for the tensile stress to be reduced or eliminated.

The method of forming the facet with the built in compressive stress in the glass can be accomplished several ways according to the present invention. Specifically, under one approach the steel is maintained at a higher temperature than the glass during bonding. For example, a heated fluid, heat lamps, electrical heaters, or other such means can be used to heat the steel facet/heat exchanger. Conversely, the glass is cooled by the form on which it is placed. This form, or mandrel, maintains a certain curvature or flatness (e.g., a vacuum table or other surface having a cooling fluid, refrigerating coils). The steel can be at a temperature of, say, 100 degrees Centigrade—well above its operational temperature in the field—while the surface in contact with the glass can be maintained at a temperature less than, or equal to, room temperature. Thus, when the steel/glass laminate is bonded together and then removed from the bonding table, the steel would tend to contract far more than the thin glass (typically, of the order of 1 mm), thus putting the glass in compression.

In addition, if the glass were maintained at a temperature less than its operating temperature during the bonding process, then the glass would tend to expand, but being constrained by the steel, would encounter additional compressive stresses. This latter effect, however, though beneficial from a stress standpoint, could decrease the rate at which the adhesive is cured depending on the type of adhesive and its cure rate vs. temperature properties. On the other hand, there are many adhesives for which this would not be a problem, and high cure rates could be achieved even at temperatures well below room temperature. Since glass in compression is approximately as strong as steel, the compressed glass would have greatly improved integrity and life.

It is important to note that the adhesive bond is preferably fully cured, since otherwise the compliance and "flow" of the adhesive would tend to reduce the compressive stress in the glass. It is also preferred to have the bonding process completed as quickly as practical to have a high production rate from the tool to reduce costs. Therefore, for adhesives requiring elevated temperatures for rapid curing, the glass is not cooled to a low temperature, since this tends to lower the rate at which the adhesive bond is cured, especially close to the glass interface. Rather, the steel is heated to a temperature above the maximum operating temperature, but well below the acceptable operating temperature for the adhesive. Again, the preferable approach is to have the adhesive formulated for rapid cure even at temperatures at, or well below, room temperature. Rapid curing allows significant temperature differences between the glass and steel, which in turn allows greater compressive loads to be imposed on the glass.

By minimizing the tensile stresses, or preferably, imposing compressive stresses in the glass, we are also able to have a higher temperature in the fluid that is used to cool the mirrors and a higher pressure. The higher fluid temperature and higher pressure tends to cause the glass to bow out, forming a convex shape. By being able to operate the mirrors at a higher temperature, higher efficiency is achieved in the power conversion system (e.g., Organic Rankine Cycle turbine) or greater benefits are achieved for process heat or space heating applications. By being able to operate at a higher pressure, we can also have higher flow rates. Thus the height of the channels is diminished, less coolant is used, and the weight of the facet with the coolant is reduced—all of which reduces costs.

It should also be noted that the shape of the mirror facet is preferably triangular. This is a key feature of the preferred embodiment. The triangular shape allows the design to be used with a "geodesic dome" supporting structure. A novel modification has been made to the usual approach for joining the struts that form the geodesic shape needed to have the right optical shape (usually, a hyperboloid). This design has a plate which allows the facets to be affixed to the plate by adjustment screws or fixtures. The plate is sized such that the facets can be overlapped, to maximize the reflected energy to the receiver below the tower mounted reflector, and to minimize exposure of the tower structure behind the facets to intense radiation from the heliostats below.

Returning now to FIG. 1, the use of the facet in a representative system application is highlighted as follows. In this case, approximately 450 square meters of reflectors 22 are arranged to form a hyperboloidal shape, located on top of the tower structure 24. The reflectors redirect energy delivered from a field of heliostats 32 (approximately 1300 heliostats of approximately 10 square meters area in this example) back to ground level. This redirected energy will deliver approximately 10 Megawatts of thermal energy (for the specific field design selected), which is then transformed into approximately 3 to 5 Megawatts of electrical power by the through conversion in a gas turbine or combined cycle system, using for example, a steam turbine and Organic Rankine bottoming cycle.

There are various uses of the waste heat collected at the tower reflector, which is at a temperature of the order of 50 to 100 degrees Centigrade. These uses include but are not limited to industrial process heating, space heating, or conversion to additional electric power in a low temperature Organic Rankine cycle turbine, as is commonly done with geothermal plants and in certain co-generation applications.

In particular, conversion of waste heat to additional electric power provides unique economic benefits. For example, the peak flux on the facets is typically of the order of 50 kW/m$^2$ or higher, and the average flux is of the order of 5 to 10 kW/m$^2$. A pump, located on the ground, delivers a water/ethylene glycol (or equivalent) solution to the top of the tower structure 24. The heat transfer fluid then splits into a combination of series and parallel flows through the reflector facets in such a fashion as to maintain the facet operating temperature at approximately 80 to 100 degrees C. while keeping the pressure drop to a preferred level.

The outlet of the reflectors 22 is returned to ground level to interface with the Organic Rankine bottoming cycle via a heat exchanger. The additional power generated in the bottoming cycle from use of the pumped loop cooled facets generates sufficient cash flow to pay for the active thermal management system and the facets. In this case, we have assumed a relatively low price for the electricity sales of $0.10/kilowatt hour. Therefore, in markets where solar electrical power is priced at values of the order of $0.10/kilowatt hour or above (i.e., so-called Green Power Pricing markets, or in subsidized or Portfolio Standards markets) we can expect that the thermally cooled facet design disclosed herein will more than pay for the entire tower reflector concept through waste heat recovery.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A high concentration central receiver system for a solar power plant, the central receiver system comprising:
   a field of heliostats;
   a plurality of interconnected reflectors coupled to a tower structure at a predetermined height above ground for reflecting solar radiation obtained from the heliostats;
   a plurality of concentrators disposed between the reflectors and the ground such that the concentrators receive reflected solar radiation from the reflectors;
   a heat removal system for providing a heat conductive fluid to the tower structure for removing heat from the plurality of interconnected reflectors and an area immediately adjacent the concentrators; and wherein the reflectors are interconnected to form a geodesic dome structure with varying overlap between the reflectors.

2. The central receiver system of claim 1 wherein each reflector includes:
   a mirror;
   a facet having walls defining a coolant channel, the coolant channel connected to one or more adjacent reflectors such that the adjacent reflectors receive the heat conductive liquid from the heat removal system and pass the fluid through the channel; and
   an adhesive compound disposed between the mirror and the facet such that the mirror is fixed to the facet under compressive stresses.

3. The central receiver system of claim 2 wherein the mirror has a compression stress value imposed by the facet over an operating temperature range.

4. The central receiver system of claim 2 wherein the facet includes cooling fins for removing heat from the heat conductive fluid.

5. The central receiver system of claim 2 wherein the facet includes a turbulence generating system for disturbing laminar flow of the heat conductive liquid.

6. The central receiver system of claim 5 wherein the facet includes a metal backing coupled to a metal substrate of the mirror, the metal backing and the substrate having alternating projections extending into the coolant channel.

7. The central receiver system of claim 5 wherein the facet includes a molded backing coupled to the mirror, the molded backing having a plurality of fins extending into the coolant channel.

8. The central receiver system of claim 7 wherein the molded backing includes reinforced plastic.

9. The central receiver system of claim 5 wherein the walls of the facet defining the coolant channel include a plurality of alternating projections extending into the coolant channel.

10. The central receiver system of claim 2 wherein the facet has walls defining a plurality of coolant channels.

11. The central receiver system of claim 2 wherein the reflector further includes a stiffening plate disposed between the mirror and the facet.

12. The central receiver system of claim 11 wherein the stiffening plate has a honeycomb shape.

13. The central receiver system of claim 2 wherein the facet further includes a plurality of attachment fittings for coupling the reflector to the structure.

14. The central receiver of claim 13 wherein the attachment fittings include a plurality of threaded studs.

15. The central receiver of claim 13 wherein the attachment fittings include a plurality of coolant fittings for connecting the coolant channel to coolant channels of adjacent reflectors.

16. The central receiver system of claim 1 wherein each reflector has a triangular geometry.

* * * * *